US012184607B2

(12) United States Patent
Kumar et al.

(10) Patent No.: US 12,184,607 B2
(45) Date of Patent: *Dec. 31, 2024

(54) GENERATING MULTIPLE INTERNET PROTOCOL (IP) ADDRESSES IN WIRELESS NETWORK

(71) Applicants:RAKUTEN MOBILE, INC., Tokyo (JP); RAKUTEN MOBILE USA LLC, San Mateo, CA (US)

(72) Inventors: Nitish Kumar, Indore (IN); Pawan Shriwas, Indore (IN); Pratik Mahajan, Indore (IN); Niyank Bam, Indore (IN)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/041,709

(22) PCT Filed: Dec. 23, 2022

(86) PCT No.: PCT/US2022/053941
§ 371 (c)(1),
(2) Date: Feb. 15, 2023

(87) PCT Pub. No.: WO2024/102151
PCT Pub. Date: May 16, 2024

(65) Prior Publication Data
US 2024/0323162 A1    Sep. 26, 2024

(30) Foreign Application Priority Data

Nov. 10, 2022  (IN) .............................. 202241064362

(51) Int. Cl.
*H04L 61/5007*  (2022.01)
*H04L 61/5061*  (2022.01)

(52) U.S. Cl.
CPC ...... *H04L 61/5061* (2022.05); *H04L 61/5007* (2022.05)

(58) Field of Classification Search
CPC ........................ H04L 61/5061; H04L 61/5007
See application file for complete search history.

(56) References Cited

U.S. PATENT DOCUMENTS 11,689,498 B1 *  6/2023  Kumar ................ H04L 61/5007
                                                    709/245
11,818,092 B2 *  11/2023  Kumar ................ H04L 61/5007
(Continued)

OTHER PUBLICATIONS

International Search Report issued Apr. 12, 2023 in Application No. PCT/US2022/053941.

(Continued)

*Primary Examiner* — Nicholas P Celani
*Assistant Examiner* — Wuji Chen
(74) *Attorney, Agent, or Firm* — Sughrue Mion, PLLC

(57) ABSTRACT

Embodiments herein provide a method for generating multiple IP addresses in a wireless network by a system (100). The method includes receiving user request to generate multiple IP addresses of at least one network element. Further, the method includes retrieving the IP address template corresponding to the at least one network element from a database (120) based on the user request, wherein the IP address template comprises a plurality of network parameters corresponding to positionally encoded bits of an IP schema. Further, the method includes generating the multiple IP addresses of the at least one network element based on the set of user defined labels, the count of the multiple of IP addresses of the at least one network element, the IP address template and the IP schema. Further, the method includes displaying the generated multiple IP addresses of the at least one network element.

10 Claims, 10 Drawing Sheets

(56) References Cited

U.S. PATENT DOCUMENTS

| | | | |
|---|---|---|---|
| 2005/0198247 A1* | 9/2005 | Perry | H04L 9/40 |
| | | | 709/223 |
| 2009/0109469 A1* | 4/2009 | Han | H04N 1/00204 |
| | | | 358/1.15 |
| 2009/0310512 A1* | 12/2009 | Sen | H04L 41/0843 |
| | | | 370/254 |
| 2017/0104628 A1* | 4/2017 | Vaideeswaran | H04L 41/0816 |
| 2019/0149508 A1* | 5/2019 | Silvestro | H04L 61/4511 |
| | | | 709/238 |
| 2021/0037105 A1* | 2/2021 | Smith-Denny | H04L 67/51 |
| 2023/0239267 A1* | 7/2023 | Kumar | H04L 61/5007 |
| 2024/0097980 A1* | 3/2024 | Iwahashi | H04L 41/084 |

OTHER PUBLICATIONS

Written Opinion issued Apr. 12, 2023 in Application No. PCT/US2022/053941.

\* cited by examiner

300

| Prefix Bit | Schema Name |
|---|---|
| 64 | vRAN_eNodeB_Sept7_2021 |

| 16 | 32 | 48 | 64 | 80 | 96 | 112 | 128 |
|---|---|---|---|---|---|---|---|
| 2 4 0 b | c 0 S M | G I S 1 | P F N S | 0 0 0 0 | V V I I | R R R R | R R R R |

IP Address Manager
IP Schema > Add Parent Schema     Search Apps     Apps

| Service Category* | Name* | IP Version* | Remark |
|---|---|---|---|
| vEPC | vRAN Parent Schema | IPv6 | It will be base schema used for overall vRAN Category |
| vRAN | | | |
| vIMS | | | |
| Inter Connect | | | |
| IMS-MGMT | | | |
| UDC | | | |
| GC Service | | | |

0/40     0/100

| 16 | 32 | 48 | 64 | 80 | 96 | 112 | 128 |
|---|---|---|---|---|---|---|---|
| xxxx | xxxx | xxxx | xxxx | xxxx | xxxx | xxxx | xxxx |

+ Add Subpart

GENERATING MULTIPLE INTERNET PROTOCOL (IP) ADDRESSES IN WIRELESS NETWORK

CROSS REFERENCE TO RELATED APPLICATIONS

This application is a National Stage of International Application No. PCT/US2020/053941 filed on Dec. 23, 2022, claiming priority based on Indian Patent Application No. 202241064362 filed on Nov. 10, 2022.

FIELD OF INVENTION

The present disclosure relates to an Internet Protocol (IP) addresses management method, and more particularly to a method and a system for generating multiple IP addresses in a wireless network.

BACKGROUND

In general, Internet Protocol (IP) addresses are unique identifiers for each device within a network. The IP addresses assist with network interface identification as well as location information. Each device connected to the network requires a unique IP address. Through an IP schema, a user (aka "operator") can plan meaningful IP address assignments to a host. The IP addresses can be vendor, service category, service type or device type specific based on decision of an IP planning team or a network team. Multiple IP templates can be built using one IP schema. The IP template is planned to configure number of IPs required for only one category/type/vendor. The IP addresses are generated using the IP template (via the IP schema). The IP addresses can include multiple properties or characteristics associated, which assists in identifying the device associated with the network. Thus, results in ensuring consistency, reducing time spent for provisioning new devices, overcoming potential address conflicts, providing meaningful and identifiable IP addresses in the network.

Although, existing methods generate the only one IP address for each configuration defined in the IP template. The existing methods do not generate variable number of IPs for different flavor of a network service (NS) descriptor or need of automation where number of components or number of interfaces may be variable.

Due to variable number of requirements of IPs, the user may need to request multiple times to generate IPs from the IP template for same configuration where multiple range of IPs are possible. Thus, results in unfavorable for the user to maintain and assign the IP based on flavor requirement or resource requirement.

Thus, it is desired to address the above-mentioned disadvantages or other shortcomings or at least provide a useful alternative.

OBJECT OF INVENTION

The principal object of the embodiments herein is to provide a method and a system for generating multiple Internet Protocol (IP) addresses in a wireless network. The proposed method enhances an existing IP generation functionality in which a user of the system provides inputs for count of IP address needed for each configuration. Thus, results in assisting the user to generate number of IPs in one go which will assist in maintaining and assigning the IPs.

The proposed method can be used to define and organize multiple IP planning/schema definitions for each component/element or category associated the device in the wireless network. The proposed method provides a faster and automated IP generation with flexibility of allocation and de-allocation. The proposed method also ensures consistency, reduces time spent for provisioning new devices, overcome potential address conflicts, provide meaningful and identifiable IP addresses (details can be derived from the IP addresses) in the network. Further, the proposed method assist to generate and allocate multiple IPs of variable interfaces in one go which will improve maintenance and assignment based on a flavor requirement or a resource requirement.

SUMMARY

Accordingly, the embodiment herein discloses a method for generating multiple IP addresses in a wireless network. The method includes receiving a user request to generate multiple IP addresses of at least one network element. The user request includes a set of user defined labels corresponding to at least one IP configuration of the at least one network element defined in an IP template, and a count of the multiple IP addresses generated for the at least one IP configuration of the at least one network element defined in the IP template. Further, the method includes retrieving the IP address template corresponding to the at least one network element from a database based on the user request, where the IP address template includes a plurality of network parameters corresponding to positionally encoded bits of an IP schema. Further, the method includes generating the multiple IP addresses of the at least one network element based on the set of user defined labels, the count of the multiple of IP addresses of the at least one network element, the IP address template and the IP schema. Further, the method includes displaying the generated multiple IP addresses of the at least one network element.

Accordingly, the embodiment herein disclose a system for generating multiple IP addresses in a wireless network. The system includes a processor communicatively coupled to a memory. The processor is configured to receive a user request to generate multiple IP addresses of at least one network element. The user request includes a set of user defined labels corresponding to at least one IP configuration of the at least one network element defined in an IP template, and a count of the multiple IP addresses to generated for the at least one IP configuration of the at least one network element defined in the IP template. Further, the processor is configured to retrieve the IP address template corresponding to the at least one network element from a database based on the user request. The IP address template includes a plurality of network parameters corresponding to positionally encoded bits of an IP schema. Further, the processor is configured to generate the multiple IP addresses of the at least one network element based on the set of user defined labels, the count of the multiple of IP addresses of the at least one network element, the IP address template and the IP schema. Further, the processor is configured to display the generated multiple IP addresses of the at least one network element.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

The method and the system are illustrated in the accompanying drawings, throughout which like reference letters indicate corresponding parts in the various figures. The embodiments herein will be better understood from the following description with reference to the drawings, in which:

FIG. 3 is an example IP schema diagram in which each new color represents a subpart of IP address which can be constant, user input, template input or range, according to the embodiments as disclosed herein;

FIG. 4A is an example illustration in which creation of a parent IP schema is depicted, according to the embodiments as disclosed herein;

FIG. 4B is an example illustration in which configuring of the required subparts as per need is depicted, according to the embodiments as disclosed herein;

FIG. 4C is an example illustration in which user of the system populates a parent IP schema and creates new schema, according to the embodiments as disclosed herein;

FIG. 6A is an example illustration in which creation of new IPs on a user interface is depicted, according to the embodiments as disclosed herein;

FIG. 6B is an example illustration in which generations of new IPs on a user interface is depicted, according to the embodiments as disclosed herein;

DETAILED DESCRIPTION OF INVENTION

Figure 1:
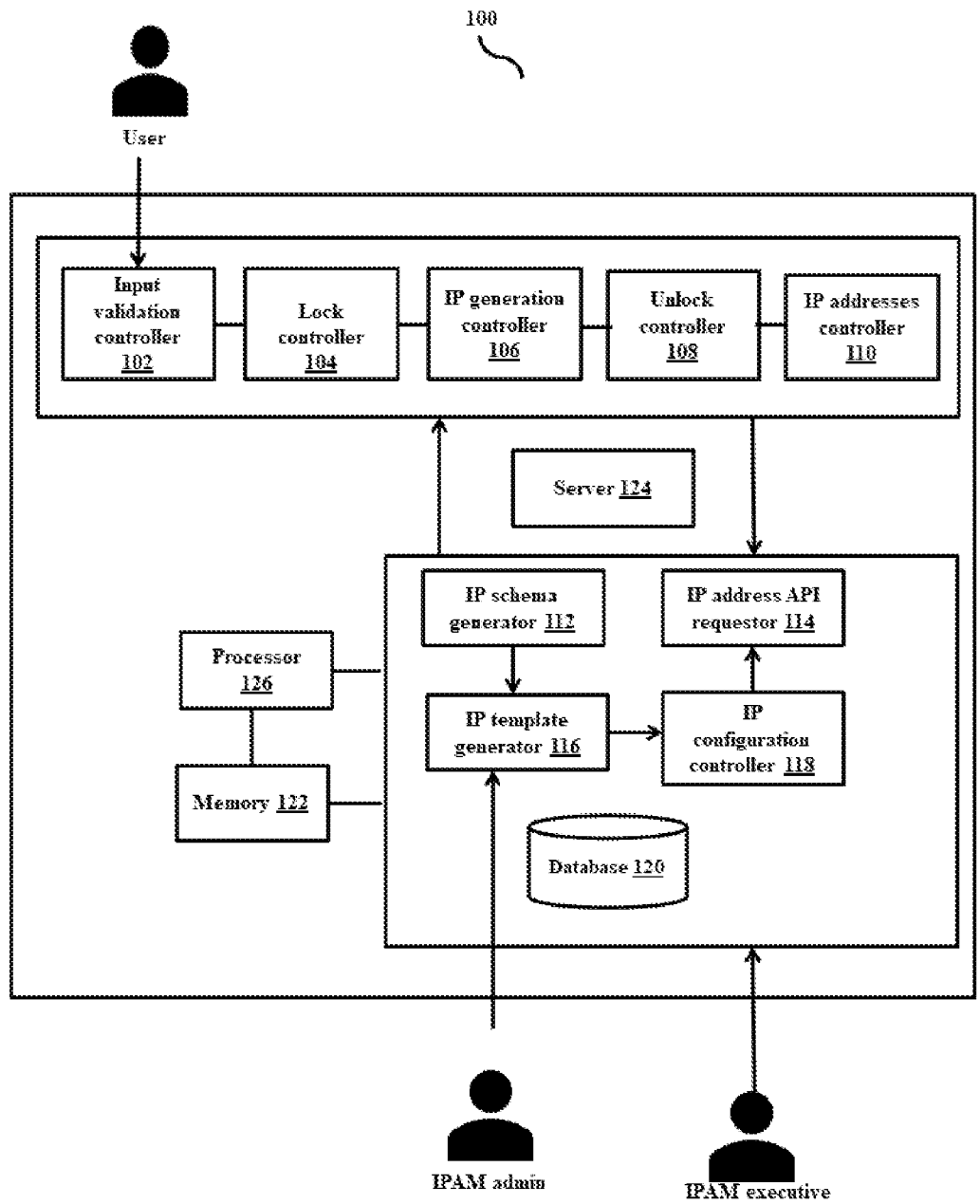
FIG. 1 shows various hardware components of a system for generating multiple internet protocol (IP) addresses in a wireless network, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for generating multiple IP addresses in a wireless network. The method includes receiving a user request to generate multiple IP addresses of at least one network element. The user request includes a set of user defined labels corresponding to at least one IP configuration of the at least one network element defined in an IP template, and a count of the multiple IP addresses to generated for the at least one IP configuration of the at least one network element defined in the IP template. Further, the method includes retrieving the IP address template corresponding to the at least one network element from a database based on the user request, wherein the IP address template comprises a plurality of network parameters corresponding to positionally encoded bits of an IP schema. Further, the method includes generating the multiple IP addresses of the at least one network element based on the set of user defined labels, the count of the multiple of IP addresses of the at least one network element, the IP address template and the IP schema. Further, the method includes displaying the generated multiple IP addresses of the at least one network element.

Unlike conventional methods and systems, the proposed method can be used to enhance an existing IP generation functionality in which a user of the system provides inputs for count of IP address needed for each configuration. Thus results in assisting the user to generate number of IPs in one go which will assist in maintaining and assigning the IPs.

Unlike conventional methods and systems, the proposed method can be used to define and organize multiple IP planning/schema definitions for each component/element or category associated the device in the wireless network. The proposed method can be used to provide a faster and automated IP generation with flexibility of allocation and de-allocation. The proposed method also ensures consistency, reduces time spent for provisioning new devices, overcome potential address conflicts, provide meaningful and identifiable IP addresses (details can be derived from the IP addresses) in the network. Further, the method can be used to assist to generate and allocate multiple IPs of variable interfaces in one go which will improve maintenance and assignment based on a flavor requirement or a resource requirement.

Referring now to the drawings and more particularly to FIGS. 1 through 7, where similar reference characters denote corresponding features consistently throughout the figures, there are shown preferred embodiments.

FIG. 1 shows various hardware components of a system (100) for generating multiple Internet Protocol (IP) addresses in a wireless network, according to the embodiments as disclosed herein. The system (100) can be, for example, but not limited to a server, a personal computer, a smart phone, a Personal Digital Assistant (PDA), a tablet computer, a laptop computer, an Internet of Things (IoT), embedded systems, edge devices, a vehicle to everything (V2X) device or the like. The wireless network can be, for example, but not limited to, a fourth generation network, a fifth generation network, a sixth generation network and an open radio access network (ORAN) network or the like.

In an embodiment, the system (100) is hosted on a cloud architecture (not shown). In some embodiment, the system 100 includes components described hereinafter in FIG. 7. In some embodiments, the system (100) hosts a cluster of servers, such as a cloud service. In some embodiments, the system (100) hosts a public cloud. In some embodiments, the system (100) hosts a private cloud.

Figure 7:
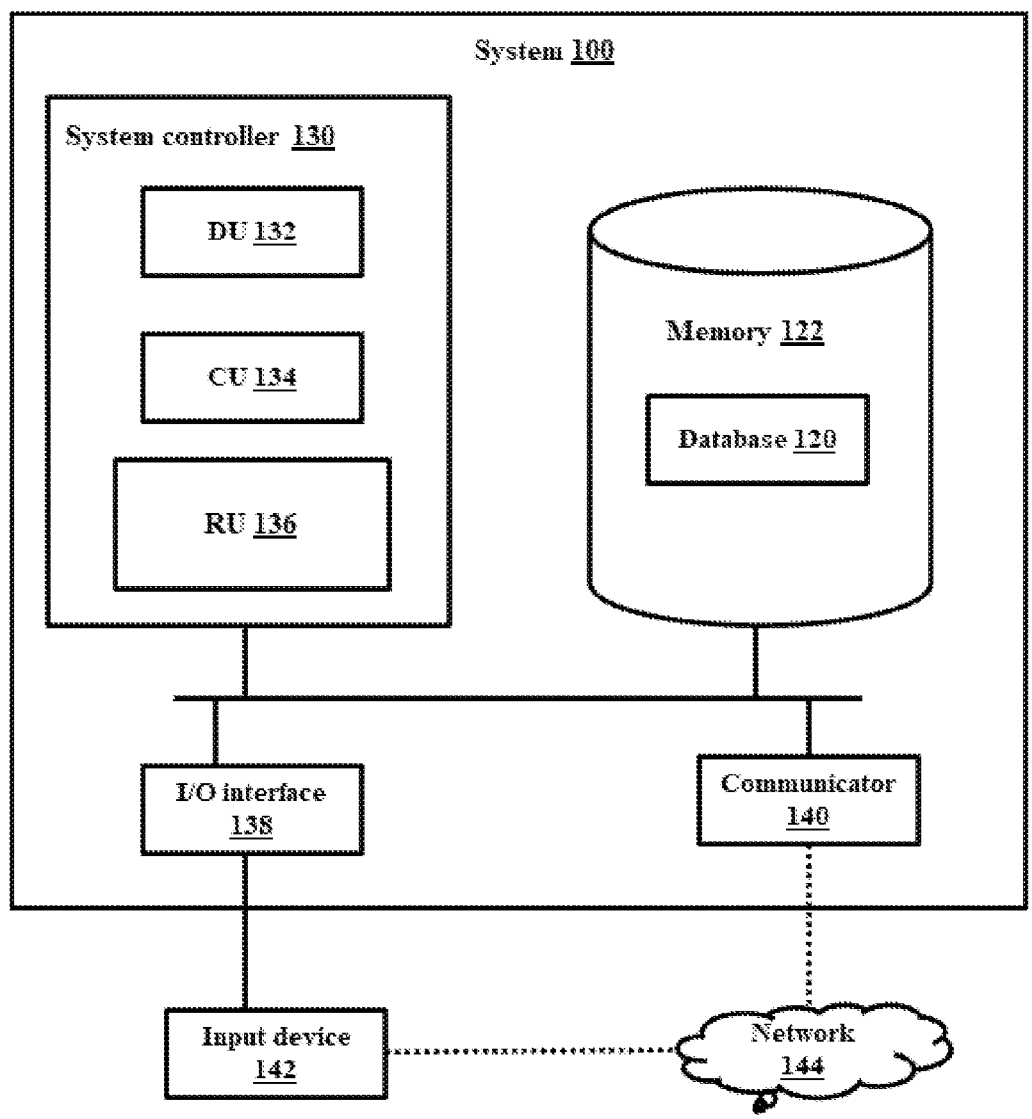
FIG. 7 is an example block diagram of a hardware configuration of the system for generating multiple IP addresses in the wireless network, according to the embodiments as disclosed herein.

In some embodiments, the cloud architecture provides resources and manages services, such as virtual machines and services, to connect the resources on the cloud. In some embodiments, the cloud architecture is an Open RAN environment, the RAN is disaggregated into three main building blocks, a Radio Unit (RU) (136), a Distributed Unit (DU) (132), and a centralized Unit (CU) (134) (as shown in FIG. 7). In some embodiments, the RU (136) receives, transmits, amplifies, and digitizes the radio frequency signals. In some embodiments, the RU (136) is located near, or integrated into an antenna to avoid or reduce radio frequency interference. In some embodiments, the DU (132) and the CU (134) form a computational component of a base station, sending the digitalized radio signal into the network. In some embodiments, the DU (132) is physically located at or near the RU. In some embodiments, the CU (134) is physically separated from the DU (132) and the RU (136) and is located nearer the core. In some embodiments, a cloud environment implements the Open RAN based on protocols and interfaces between these various building blocks (radios, hardware, and software) in the RAN. Examples of Open RAN interfaces include a front-haul between the Radio Unit (136) and the Distributed Unit (132), mid-haul between the Distributed Unit (132) and the Centralized Unit (134) and Backhaul connecting the RAN to the core. In some embodiments, the DU (132) and the CU (134) are virtualized and run in a server or a cluster of servers.

The system (100) includes an input validation controller (102), a lock controller (104), an IP generation controller (106), an unlock controller (108) and an IP address controller (110). In some embodiments, the system (100) validates the input from the user based on the information from the IP schema and the IP template using the input validation controller (102). In at least one example, the IP schema includes information about system assigned bits and user generated bits.

The IP generation controller (106) receives a user request to generate multiple IP addresses of at least one network element. The user request includes a set of user defined labels corresponding to at least one IP configuration of the at least one network element defined in the IP template, and a count of the multiple IP addresses to generated for the at least one IP configuration of the at least one network element defined in the IP template. The network element can be, for example, but not limited to an network interface (for example, voice over IP, loopback, router-router, router-host, management interface, and the like), a category (for example, vRAN, Core, Small Cell, and the like) of a device in the wireless network, a type of device (for example, be vCU or vDU for RAN or the like) in the wireless network, a vendor of a device in the wireless network, a service category of a device in the wireless network, and a network interface in the wireless network.

Figures 6A, 6B:
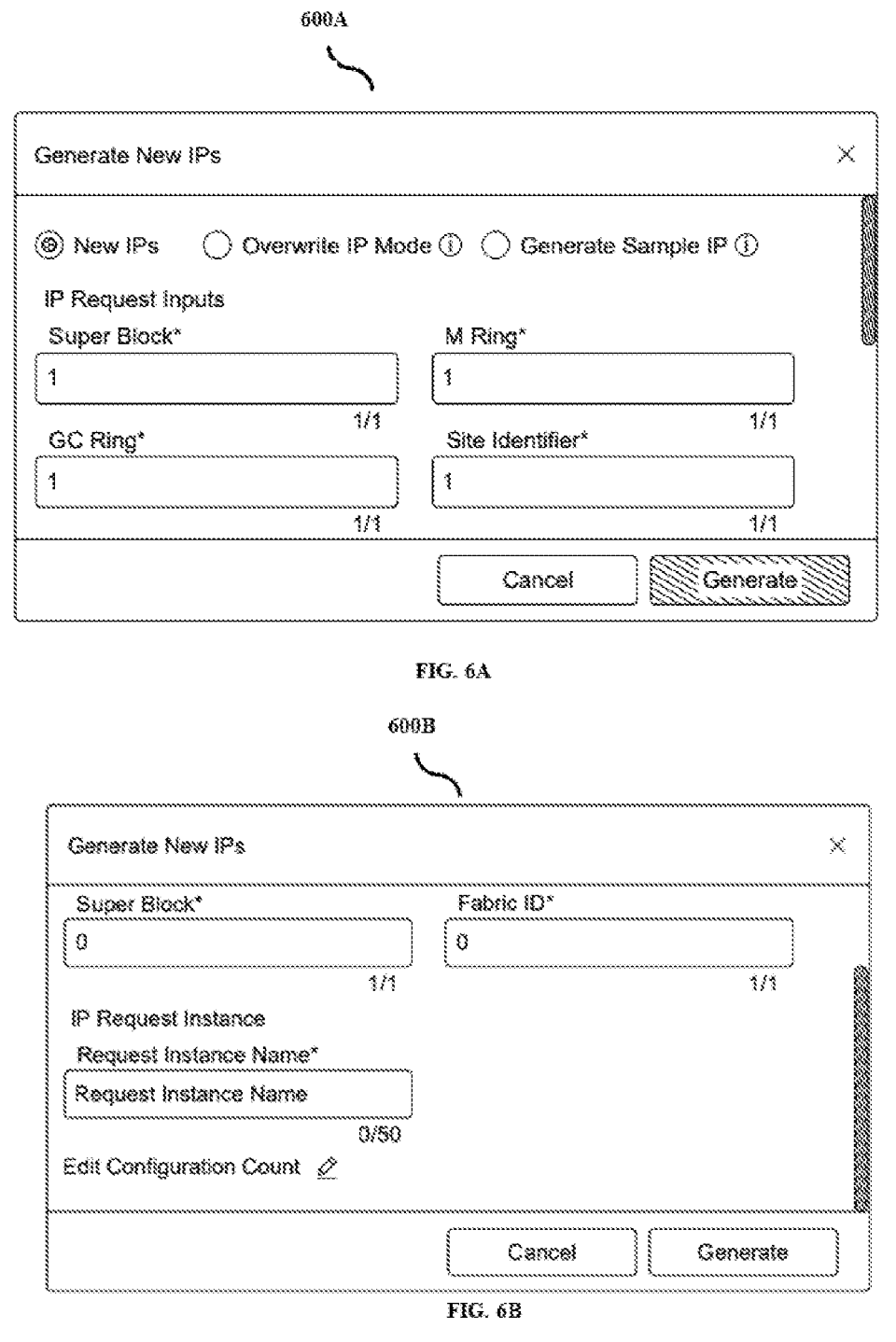
Figure 6C:
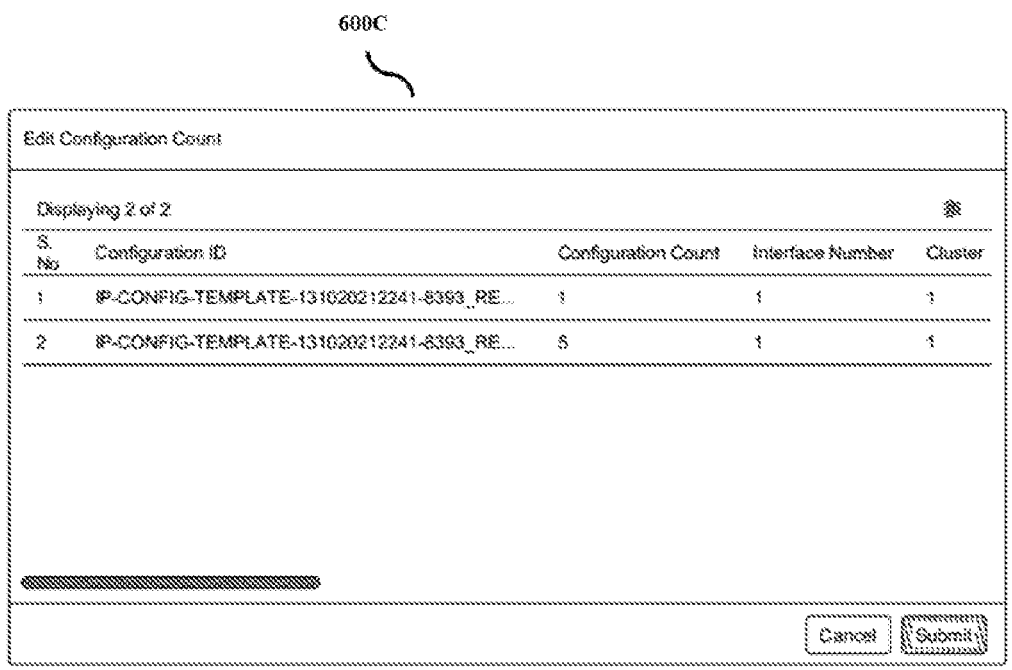
FIG. 6C is an example illustration in which edit configuration count on a user interface is depicted, according to the embodiments as disclosed herein.

In an embodiment, the IP generation controller (106) displays a user interface (as shown in FIG. 6A) to create the user request. The user interface displays a plurality of input fields that describe one or more network parameters of the plurality of network parameters in the IP address template network parameters and an IP configuration count indication. Further, the IP generation controller (106) receives the user defined label inputted in each input field of the plurality of input fields by the user. Further, the IP generation controller (106) receives an input on the IP count configuration indication. Further, the IP generation controller ((106) displays an IP configuration count interface (as shown in FIG. 6C) comprising a configuration count field to configure the count of the multiple IP addresses to generated for the at least one IP configuration of the at least one network element. Further, the IP generation controller (106) receives the count of the multiple IP addresses inputted in the configuration count field by the user. Further, the IP generation controller (106) generates the user request based on the inputted user defined labels in each of the input fields and the inputted count of the multiple IP addresses to be generated for the at least one IP configuration of the at least one network element.

Further, the IP generation controller (106) retrieves the IP address template corresponding to the at least one network element from a database (120) based on the user request. The IP address template comprises the plurality of network parameters corresponding to positionally encoded bits of an IP schema.

Further, the IP generation controller (106) generates the multiple IP addresses of the at least one network element based on the set of user defined labels, the count of the multiple of IP addresses of the at least one network element, the IP address template and the IP schema. In an embodiment, the IP generation controller (106) determines a set of system generated labels that describe the one or more network parameters of the plurality of network parameters defined in the IP address template based on the user request. Based on the set of user defined labels, the count of the multiple of IP addresses of the at least one network element, the IP address template, the IP schema, and the system generated labels, the IP generation controller (106) generates the multiple IP addresses of the at least one network element.

Further, the IP generation controller (106) displays the generated multiple IP addresses of the at least one network element. Further, the IP generation controller (106) allocates the multiple IP addresses to the at least one network element.

Further, the system (100) includes a server (124) (e.g., IP address management server or the like). In some embodiments, the IP management server (124) is a virtual server. In some embodiments, the IP address management server (124) is a process running on the cloud service, such as on the cloud architecture. In some embodiments, the IP address management server (124) includes an IP schema generator (112), an IP address API requestor (114), an IP template generator (116), an IP configuration controller (118), and a database (120). In some embodiments, the IP address management server (124) interfaces with one or more users via an API. In some embodiments, the IP address management server (124) serves as a webpage over the network.

In some embodiments, the IP address management server (124) receives a request to generate the IP schema. For example, the user requests the IP address management server (124) to generate the IP schema. In some embodiments, the IP schema generator (112) receives information from the database (120) regarding IP parameters of the network. In some embodiments, the IP parameters of the network include information about the hierarchy and interconnections between the various devices on a network, the layers in the network, the vendor of a network device, the service category the network device is used in, the type of service provided by the device, the type of service provided by the network device, or the like. For example, the IP schema generator (112) in an Open RAN can receive information about the configuration and devices in different layers of the network such as the RU (136), DU (132) and the CU (134). In at least one example, the IP schema generator (112) receives information about the RU (136) that includes information about the vendor of the RU, the frequency of the radio waves, the direction the RU (136) is pointed in, the location of the RU, the type of service the RU (136) provides such as a $4^{th}$ generation radio network, or the like.

In some embodiments, the user provides an IP planning design for logical assignment of IP addresses to devices. In some embodiments, the IP planning design is based on the IP parameters of the network that enables an authorized user, with information about the IP planning design, to discern information about the location of a device, the position of the device in the hierarchy of devices, or the like. For example, the authorized user allocates a specific portion of the IP address with a specific alpha-numeric bit entry to all devices located in New York. The alpha-numeric bit entry allows authorized users to use the IP address to decipher information about the device. Users without access to the IP planning design cannot discern much information without access to multiple devices on the network. This obscurity improves security of the IP addresses and the Open RAN. In some embodiments, the IP schema generator (112) receives position encoding for the IP parameters from the user (i.e., admin). For example, the user (i.e., admin) allocates bits with specific information that signifies the location of the device, the type of service provided by the device, or the like. In some embodiments, the system (100) receives via an application programming interface (API) such as a cloud API information that should be assigned to a specific bit in the IP address to indicate the location of service is New York. In some embodiments, the system (100) presents a graphical user interface (GUI) on a webpage to receive information. In some embodiments, the system (100) receives via the API information about a range of bits that are allocated to devices of the same type. For example, the range of bits following a fixed bit usable for all RUs in the network from a specific vendor. The range of bits is allocated to multiple RU's while the fixed bit identifies the vendor.

In some embodiments, the IP schema provides a list of bits that have specific meaning and a means to allocate the bits in specific positions to specific values, a range of values or both based on the IP planning information. In some embodiments, the IP address management server (124) determines whether the first user, such as user, is authorized to create the IP schema. In some embodiments, the first X bits in the IP address are assigned via the IP schema. For example, the IP schema generator (112) assigns the first 64 bits in a 128-bit IP address based on the IP schema; and the other bits are assigned without the use of the IP schema.

In some embodiments, the IP address management server (124) based on a determination that the user is authorized to create the IP schema, generates the IP schema based on the position encoding for the IP parameters. In some embodiments, the IP address management server (124) requests approval from another user before the IP schema is created, such as from the user. In some embodiments, in response to a determination that the user is not authorized to create the IP schema, the IP address management server (124) generates the IP address without the IP schema. In some embodiments, in response to a determination that the user is not authorized to create the IP schema, the IP address management server (124) is configured to generate an alert, such as an audio or visual alert. In some embodiments, the alert is transmitted, such as wirelessly transmitted, to a system administrator, such as user.

In some examples, the operations of the components of the system (100) are executed by a processor (126) based on machine readable instructions stored in a non-volatile computer readable memory. In some examples, one or more of the operations of the components of the system are executed on a different processor. In some examples, the operations of the components of the system (100) are split between multiple processors.

In some embodiments, the IP address management server (124) receives a request to generate an IP template. For example, the user requests generation of an IP template. In some embodiments, an IP template describes assignment of bits in IP addresses for one or more devices that are requested or used often. For example, while deploying RUs a vendor requests IP addresses for each of the RUs, and any new equipment such as routers to connect the RU (136) to the Open RAN. In some embodiments, the IP address management server (124) receives IP template parameters that define the relationships between the device and other devices that are often used in combination, the position of the combination of devices in a network, the configuration the combination of the devices, or the like. In some embodiments, frequent configurations are stored in the database (120) accessible by the IP template generator (116) for generating the IP template requested by the user (i.e. IPAM executive). The IP address management server (124) provides the API to receive information from the user (i.e. IPAM executive). In at least one example, the IP address management server (124) serves as a webpage with a graphical user interface to receive information from the user (i.e. IPAM executive) about a part of the network.

In some embodiments, the IP address management server (124) receives the list of IP template parameters associated with the network from the database (120), wherein the IP template parameters includes information about a first part of the network, such as the information for configuring one or more devices that are used together or multiple devices of the same type or for the same service being deployed together. In some embodiments, the IP address management server determines whether the first user is authorized to create the IP template. In some embodiments, the IP address management server (124) based on the determination that the first user is authorized, generates an IP template, using the IP template generator (116), based on IP schema, from the IP schema generator (112), for the first part of the network address. In some embodiments, in response to a determination that the user (i.e. IPAM executive) is not authorized to create the IP template, the IP address management server (124) informs the user (i.e. IPAM executive) that the user (i.e. IPAM executive) does not have authorization to create the IP template. In some embodiments, in response to a determination that the user (i.e. IPAM executive) is not authorized to create the IP template, the IP address management server (124) is configured to generate an alert, such as an audio or visual alert. In some embodiments, the alert is transmitted, such as wirelessly transmitted, to a system administrator, such as user (i.e., admin). In some embodiments, the IP address management server (124) receives information about the first part of the network address from the user (i.e. IPAM executive). In some embodiments, the IP address management server (124) requests approval from the user (i.e. IPAM executive) before generating the IP template. In some examples, the IP template provides information such as the dynamic IP ranges for the devices that are part of a service or template based on the IP schema. For example, the IP template is able to further allocate bits in the IP address to the first part of the network address to allow differentiation of the devices, types, or the like. In some examples, the IP template simplifies deployment of IP addresses to devices and maintains consistency between configurations. In some examples, the user (i.e. IPAM executive) dynamically generates an IP template for a specific deployment to help identify devices associated with that deployment.

In some embodiments, the IP address management server (124) receives a request from the user (i.e. IPAM executive) on behalf of the user to generate an IP address. In some embodiments, the IP address management server (124) generates an IP address based on the IP schema and the IP template. In some embodiments, the IP address management server (124) requests authorization from a second user, such as user (i.e., admin), based on the IP template or the IP schema. For example, the IP configuration script controller (118) determines, based on the IP template or the IP schema, that the IP address requested is a device or a type of service that is located higher up in the hierarchy of the network that the user (i.e. IPAM executive) is authorized to address and, based on the information request, additional authorization from the second user, such as user (i.e., admin), is to be requested before generating the IP address.

In some embodiments, the IP address management server (124) receives a request from the user to generate an IP address. The IP address management server (124) notifies the user (i.e. IPAM executive) about the request. In some embodiments, the user is not a member of the organization running the Open RAN. For example, the user is a vendor who deploys RUs amongst other vendors. The IP address management server (124) shields the network by segregating the IP generation process from the vendors. In some embodiments, the IP address management server (124) receives an IP Template that applies to the request from the user. In some embodiment, the IP address management server (124) requests additional information from the user (i.e. IPAM executive) based on the IP template and the IP schema. For example, the IP address management server (124) requests information, such as the superblock of the device or part of the network, a cluster ID of the device, a Fabric ID of the device, a radio control port node number, or a Node Type to generate an IP address.

In some embodiments, the IP address management server (124) generates the IP address using an IP address generation API. The IP address management server (124) queries the database (120) via an API which links an IP generation gateway and the IP address management server (124). The API firewalls the information about the network from the user. In some embodiments, the IP address management server (124) locks the IP address space using the lock controller (104) to prevent conflicts when IP addresses are requested by two different vendors for the same device at the same time. In some embodiments, the IP generation controller (106) generates the IP address and reserves the IP address for the device in communication with the IP address management server (124). For example, a DNS server generates the IP address.

In some embodiments, the IP generation controller (106) communicates via the API with the IP address API requestor (112). In some embodiments, the unlock controller (108) unlocks the IP address space other than the IP schema after the IP address is generated. In some embodiments, the IP generation gateway requests authorization before the IP address is released to the user. In some embodiments, the IP generation gateway requests authorization from the user (i.e. IPAM executive) or the user (i.e., admin).

The IP generation controller (106) is implemented by analog and/or digital circuits such as logic gates, integrated circuits, microprocessors, the processor (126), microcontrollers, memory circuits, passive electronic components, active electronic components, optical components, hardwired circuits and the like, and may optionally be driven by firmware.

Further, the processor (126) is configured to execute instructions stored in the memory (122) and to perform various processes. The memory (122) also stores instructions to be executed by the processor (126). The memory (122) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (122) may, in some examples, be considered a non-transitory storage medium. The term "non-transitory" may indicate that the storage medium is not embodied in a carrier wave or a propagated signal. However, the term "non-transitory" should not be interpreted that the memory (122) is non-movable. In certain examples, a non-transitory storage medium may store data that can, over time, change (e.g., in Random Access Memory (RAM) or cache).

The proposed system (100) can be used to enhance an existing IP generation functionality in which the user of the system (100) provides inputs for count of IP address needed for each configuration. Thus results in assisting the user to generate number of IPs in one go which will assist in maintaining and assigning the IPs.

Unlike conventional systems, the proposed system (100) can be used to define and organize multiple IP planning/schema definitions for each component/element or category associated the device in the wireless network. The proposed system (100) can be used to provide a faster and automated IP generation with flexibility of allocation and de-allocation. The proposed system (100) also ensures consistency, reduces time spent for provisioning new devices, overcome potential address conflicts, provide meaningful and identifiable IP addresses (details can be derived from the IP addresses) in the network. Further, the system (100) can be used to assist to generate and allocate multiple IPs of variable interfaces in one go which will improve maintenance and assignment based on a flavor requirement or a resource requirement.

Although the FIG. 1 shows various hardware components of the system (100) but it is to be understood that other embodiments are not limited thereon. In other embodiments, the system (100) may include less or more number of components. Further, the labels or names of the components are used only for illustrative purpose and does not limit the scope of the invention. One or more components can be combined together to perform same or substantially similar function in the system (100).

Figure 2A:
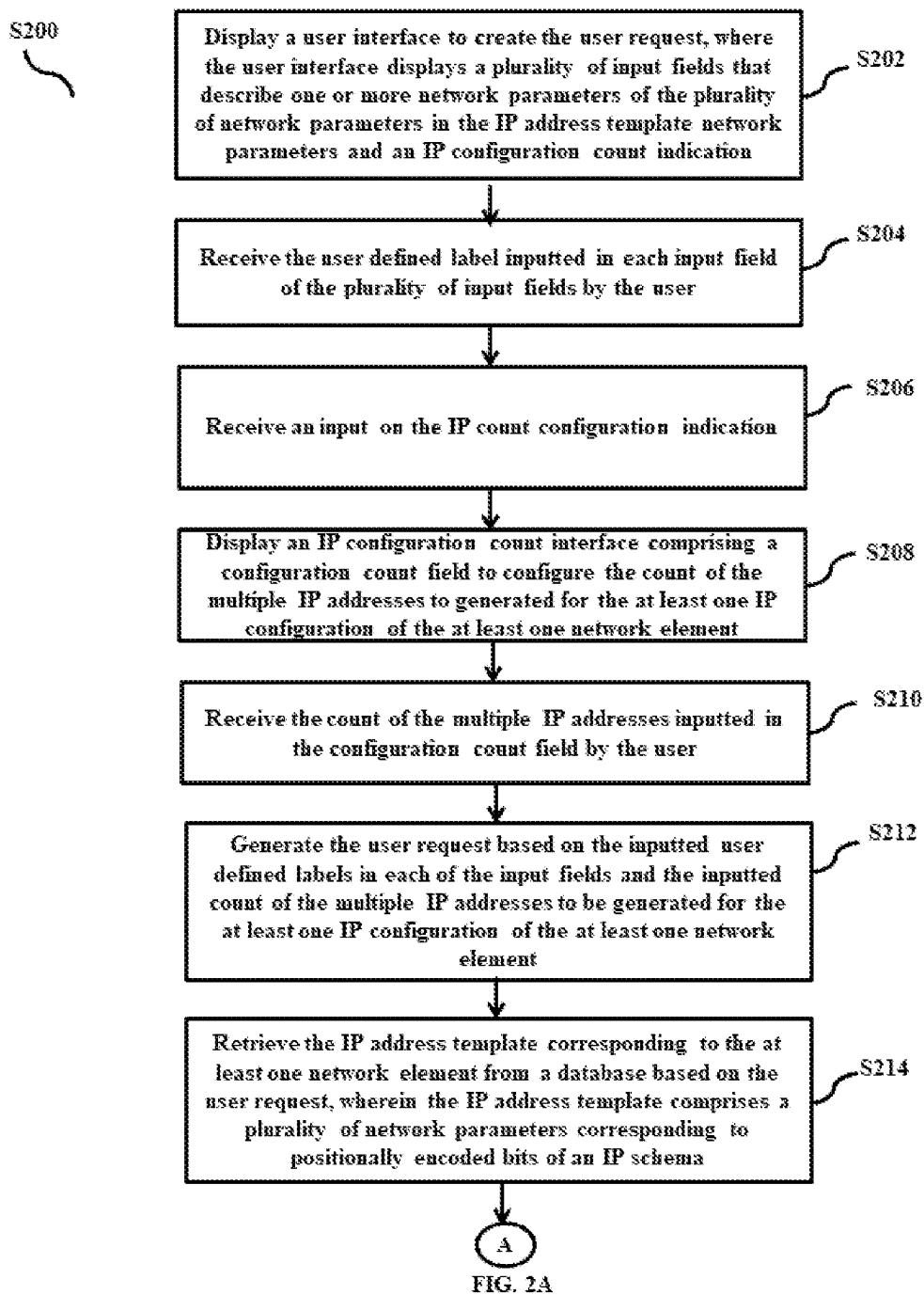
FIG. 2 is a flow chart illustrating a method for generating multiple IP addresses in the wireless network, according to the embodiments as disclosed herein.
Figure 2B:
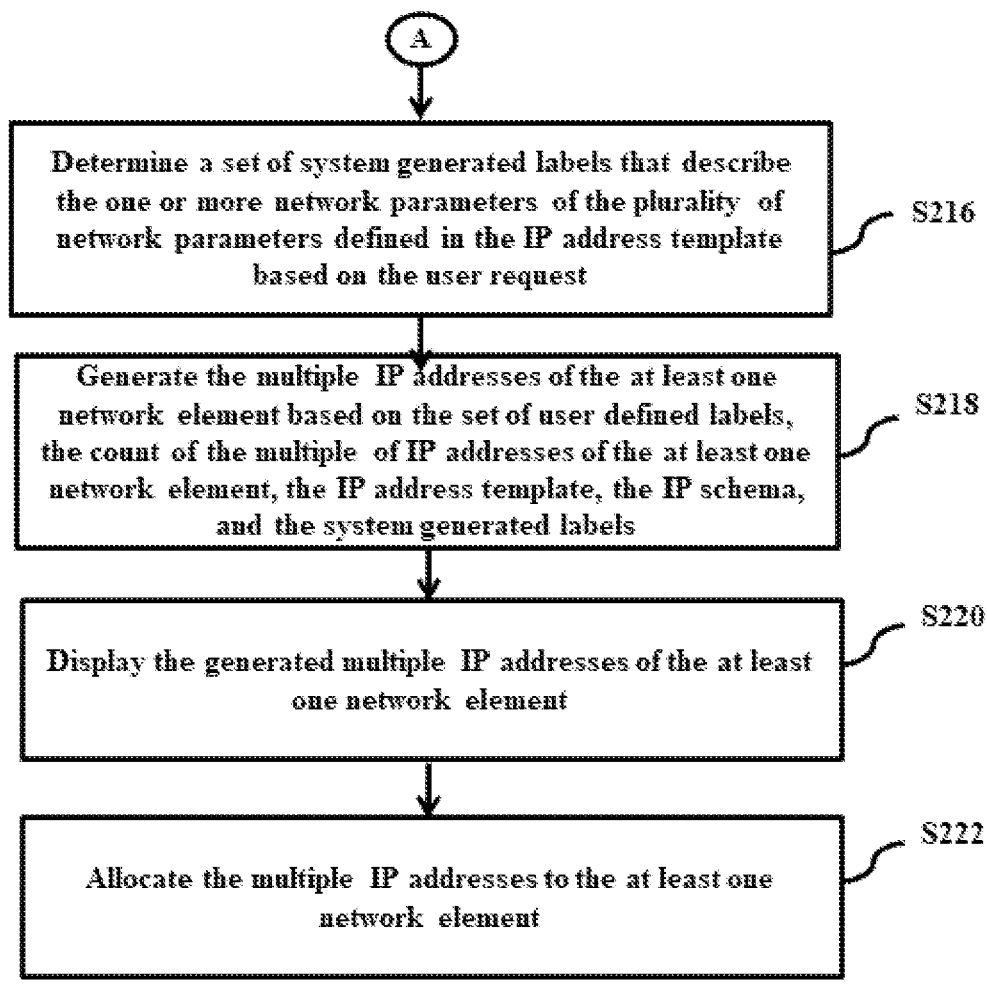

FIG. 2 is a flow chart (S200) illustrating a method for generating the multiple IP addresses in a wireless network, according to the embodiments as disclosed herein. The operations (S202-S222) are handled by the IP generation controller (106).

At S202, the method includes displaying the user interface to create the user request. The user interface displays the plurality of input fields that describe one or more network parameters of the plurality of network parameters in the IP address template network parameters and the IP configuration count indication. At S204, the method includes receiving the user defined label inputted in each input field of the plurality of input fields by the user. At S206, the method includes receiving the input on the IP count configuration indication. At S208, the method includes displaying the IP configuration count interface comprising the configuration count field to configure the count of the multiple IP addresses to generated for the at least one IP configuration of the at least one network element. At S210, the method includes receiving the count of the multiple IP addresses inputted in the configuration count field by the user. At S212, the method includes generating the user request based on the inputted user defined labels in each of the input fields and the inputted count of the multiple IP addresses to be generated for the at least one IP configuration of the at least one network element.

At S214, the method includes retrieving the IP address template corresponding to the at least one network element from the database (120) based on the user request, wherein the IP address template comprises a plurality of network parameters corresponding to positionally encoded bits of an IP schema. At S216, the method includes determining the set of system generated labels that describe the one or more network parameters of the plurality of network parameters defined in the IP address template based on the user request. At S218, the method includes generating the multiple IP addresses of the at least one network element based on the set of user defined labels, the count of the multiple of IP addresses of the at least one network element, the IP address template, the IP schema, and the system generated labels. At S220, the method includes displaying the generated multiple IP addresses of the at least one network element. At S222, the method includes allocating the multiple IP addresses to the at least one network element.

In an embodiment, the method is performed by the system (100) shown in FIG. 1 or a system controller (130) shown in FIG. 7 including sections for performing certain operations, such as the system controller (130) shown in FIG. 7 which will be explained hereinafter.

The proposed method can be used to enhance an existing IP generation functionality in which a user of the system provides inputs for count of IP address needed for each configuration. Thus results in assisting the user to generate number of IPs in one go which will assist in maintaining and assigning the IPs.

The proposed method can be used to define and organize multiple IP planning/schema definitions for each component/element or category associated the device in the wireless network. The proposed method can be used to provide a faster and automated IP generation with flexibility of allocation and de-allocation. The proposed method also ensures consistency, reduces time spent for provisioning new devices, overcome potential address conflicts, provide meaningful and identifiable IP addresses (details can be derived from the IP addresses) in the network. Further, the method can be used to assist to generate and allocate multiple IPs of variable interfaces in one go which will improve maintenance and assignment based on a flavor requirement or a resource requirement.

The various actions, acts, blocks, steps, or the like in the flow charts (S200) may be performed in the order presented, in a different order or simultaneously. Further, in some embodiments, some of the actions, acts, blocks, steps, or the like may be omitted, added, modified, skipped, or the like without departing from the scope of the invention.

FIG. 3 is an example IP schema diagram (300) in which each new color represents a subpart of IP Address which can be constant, user input, template input or range, according to the embodiments as disclosed herein.

In an embodiment, the IP schema (300) is generated using the system 100 (as shown in FIG. 1). In some embodiments, a first four bits (302) of the IP schema 200 is based on the IP address block reserved for the service provider. For example, the first four bits (302) has a value of 240b. In some embodiments, a second four bits (304) of the IP schema indicates amongst other details, the super block identifier, or a mobile ring number. For example, the IP schema a bit in the second four bits (304), such as S indicates the super block in identifier which describes where the device or service is located. For example, the name of a city in an Open RAN deployment where the device is located. For example, the values indicate the service is located in New York, Washington DC, and the like. In some embodiments, four bits in a third four bits (306), such as K indicates the infrastructure or service associated with the device. Examples of infrastructure or service in the schema I includes user equipment type such as 4th Generation network, $5^{th}$ Generation network, Wi-Fi, infrastructure, service application, or the like. In some embodiments, a fourth four bits (308) of the IP schema are reserved for assignment to groups of devices during IP generation.

In some embodiments, the values indicated by XXXX are user configurable values that are selectable amongst one or more predetermined choices. In some examples, the configurable values are binary. In some examples, the configurable values are alpha-numeric digits to encode details about the network parameters. In some embodiments, the value indicated with S, and M are obtained from the user.

The IP schema includes other sets of bits (310-316). These sets of bits are usable to provide other identifying information for the device. In some embodiments, one or more of the sets of bits (310-316) are usable to identify a deployment of the device. In some embodiments, one or more of the sets of bits (310-316) are usable to identify a type of the device. In some embodiments, one or more of the sets of bits (310-316) are usable to identify a hierarchical position of the device in the network. In some embodiments, one or more of the sets of bits (310-316) are usable to identify devices above or below the device in the hierarchy of the network. One of ordinary skill in the art would recognize that other combinations of identifying information within the IP schema 200 are within the scope of this disclosure.

The user can pre-configure the IP Schema subparts which will be auto populated during IP schema creation by user. This will help the planning team to configure the basic/prefix portion of IP Schema and user can flexibly define rest part of schema. Below (FIG. 4A-FIG. 4c) is one example, how it can be defined and used further.

FIG. 4A is an example illustration (400A) in which creation of a parent IP schema is depicted, according to the embodiments as disclosed herein. As shown in FIG. 4A, the parent IP schema is created in which the user provides the category, the IP version, the remark and the name on the parent IP schema.

Figure 4B:
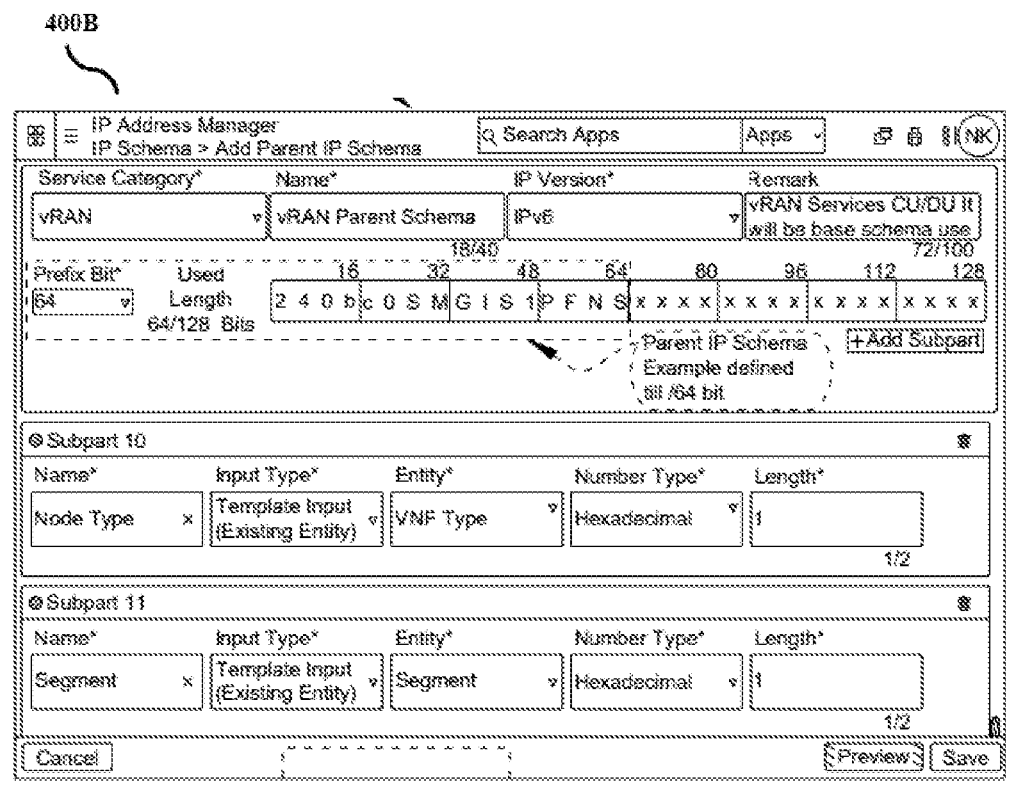

FIG. 4B is an example illustration (400b) in which configuring of the required subparts as per need is depicted, according to the embodiments as disclosed herein. The FIG. 4B is explained in connection with FIG. 4A. As shown in FIG. 4B, the required subparts as per need is configured and saved.

Figure 4C:
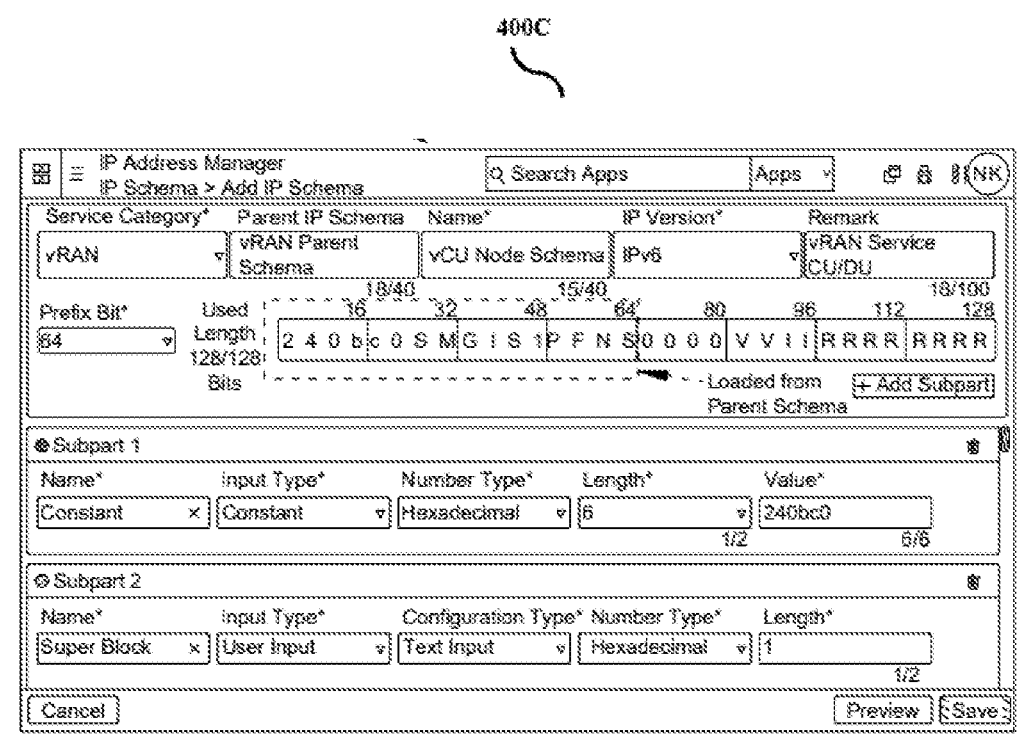

FIG. 4C is an example illustration (400c) in which user can populate parent IP schema and create new schema, according to the embodiments as disclosed herein. As shown in FIG. 4C, the user can populate parent IP schema and creates new schema in which user provides the service category, the IP version, the remark and required subparts as per need configured and saved in the user interface.

Figure 5:
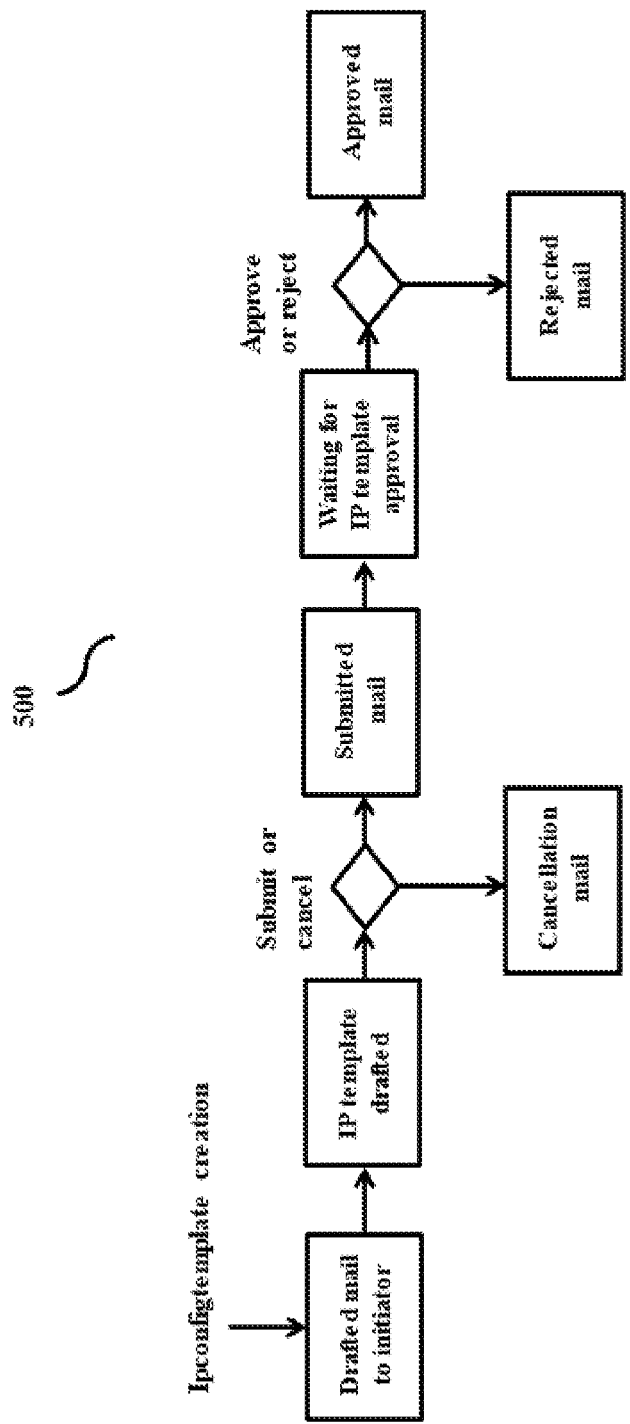
FIG. 5 is an example illustration in which IP template creation is depicted, according to the embodiments as disclosed herein.

FIG. 5 is an example illustration (500) in which IP template creation is depicted, according to the embodiments as disclosed herein. In an example, the IPAM executive creates the IP template where the user select the IP schema and based on selection, the user defines the template configuration related to all required IPs as per need. The user can draft the template and edit it multiple times unless all required configuration is completed. Then, the IPAM executive submit the IP template for approval. The IPAM admin is authority who is responsible to approve/reject the IP template based on review of schema and corresponding configuration.

FIG. 6A is an example illustration (600A) in which creation of new IPs on a user interface is depicted, according to the embodiments as disclosed herein. FIG. 6B is an example illustration (600B) in which generations of new IPs on a user interface is depicted, according to the embodiments as disclosed herein. FIG. 6C is an example illustration (600C) in which edit configuration count on a user interface is depicted, according to the embodiments as disclosed herein.

In an example, the IP generation can be performed from the approved IP template (from FIG. 5). For each new instantiation/installation of network element, the user will provide the new instance specific inputs which are configured in IP schema (of requested IP template) to generate the set of IP address configured in IP template. In addition to this, the proposed method can be used to assist to generate and allocate multiple IPs of variable interfaces in one go which will improve maintenance and assignment based on flavour or resource requirement.

The user interface displays a plurality of input fields that describe one or more network parameters of the plurality of network parameters in the IP address template network parameters and an IP configuration count indication. The user defined label is inputted in each input field of the plurality of input fields by the user. As shown in FIG. 6B, the input is received on the IP count configuration indication. Based on the input, the IP configuration count interface comprising a configuration count field to configure the count of the multiple IP addresses to generated for the at least one IP configuration of the at least one network element is displayed. The count of the multiple IP addresses is inputted in the configuration count field by the user. based on the inputted user defined labels in each of the input fields and the inputted count of the multiple IP addresses to be generated for the at least one IP configuration of the at least one network element, the user request is generated.

FIG. 7 is an example block diagram of a hardware configuration of the system (100) for generating multiple IP addresses in the wireless network, according to the embodiments as disclosed herein. The hardware configuration includes the system (100), which communicates with a network (144), and interacts with an input device (142). In an embodiment, the system (100) is a computer or other computing device that receives input or commands from the input device (142). In another embodiments, the system (100) is a host server that connects directly to the input device (142), or indirectly through the network (144). In another embodiment, the system (100) is a computer system that includes two or more computers. In another embodiment, the system (100) is a personal computer that executes an application for a user of the system (100).

The system (100) includes a system controller (130), the memory (122), the communicator (140), and an input/output interface (138). In an embodiment, the system controller (130) includes a processor or programmable circuitry executing instructions to cause the processor or programmable circuitry to perform operations according to the instructions. In an embodiment, the system controller (130) includes analog or digital programmable circuitry, or any combination thereof. In another embodiments, the system controller (130) includes a physically separated storage or circuitry (not shown) that interacts through communication. In an embodiments, the memory (122) includes a non-volatile computer-readable medium capable of storing executable and non-executable data for access by the system controller (130) during execution of the instructions. The communicator (140) transmits and receives data from the network (144). The communicator (140) is configured for communicating internally between internal hardware components and with external devices via one or more networks. The input/output interface (138) connects to various input and output units, such as input device (142), via a parallel port, a serial port, a keyboard port, a mouse port, a monitor port, and the like to accept commands and present information.

The system controller (130) includes a Radio Unit (RU) (136), a Distributed Unit (DU) (132), a centralized Unit (CU) (134), the IP address computation controller (110) and a core (not shown). In an embodiment, the RU (136), the DU (132), the CU (134) and the core are configured based on a virtual machine or a cluster of virtual machines. The DU (132), the CU (134), the core or a combination thereof is the circuitry or instructions of the system controller (130) configured to process a stream of information from the DU (132), the CU (134), the core or a combination thereof. In another embodiments, the DU (132), the CU (134), the core or a combination thereof is configured to receive information such as information from an open-RAN network (not shown). In another embodiment, the DU (132), the CU (134), the core or a combination thereof is configured for deployment of a software service in a cloud native environment to process information in real-time. In another embodiments, the DU (132), the CU (134), the core or a combination thereof records information to the memory (122), such as a database (120) (e.g., site database or the like), and utilize information in the memory (122). In another embodiments, the DU (132), the CU (134), the core or a combination thereof includes sub-sections for performing additional functions, as described in the foregoing flow charts. In at least some embodiments, such sub-sections may be referred to by a name associated with their function.

In another embodiments, the system (100) is another device capable of processing logical functions to perform the operations herein. In at least some embodiments, the system controller (130) and the memory (122) need not be entirely separate devices but share circuitry or one or more computer-readable mediums in some embodiments. In at least some embodiments, the memory (122) includes a hard drive storing both the computer-executable instructions and the data accessed by the system controller (130), and the system controller (130) includes a combination of a central processing unit (CPU) and RAM, in which the computer-executable instructions are able to be copied in whole or in part for execution by the CPU during performance of the operations herein.

In another embodiments where the system (100) is a computer, a program that is installed in the computer is capable of causing the computer to function as or perform operations associated with the system (100) of the embodiments described herein. In another embodiments, such a program is executable by the processor (126) to cause the computer to perform certain operations associated with some or all the blocks of flowcharts and block diagrams described herein. Various embodiments of the present system are described with reference to flowcharts and block diagrams whose blocks may represent steps of processes in which operations are performed or sections of the system controller (130) responsible for performing operations. Certain steps and sections are implemented by a dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR XOR, NAND, NOR, and other logical operations, flip-flops, registers, memory elements, etc., such as field-programmable gate arrays (FPGA), programmable logic arrays (PLA), etc.

Various embodiments of the present system include a system, a method, and/or a computer program product. In some embodiments, the computer program product includes a computer readable storage medium (or media) having computer readable program instructions thereon for causing a processor to carry out aspects of the present system. In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, to perform aspects of the present system.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

While embodiments of the present system have been described, the technical scope of any subject matter claimed is not limited to the above-described embodiments. It will be apparent to persons skilled in the art that various alterations and improvements can be added to the above-described embodiments. It will also be apparent from the scope of the claims that the embodiments added with such alterations or improvements are included in the technical scope of the system. The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A system for generating multiple Internet Protocol (IP) addresses in a wireless network, wherein the system comprises:
   a memory; and
   a processor, communicatively coupled to the memory, configured to:
   receive a user request to generate multiple IP addresses of at least one network element, wherein the user request comprises:
      a set of user defined labels corresponding to at least one IP configuration of the at least one network element defined in an IP template, and
      a count of the multiple IP addresses to generated for the at least one IP configuration of the at least one network element defined in the IP template;
   retrieve the IP address template corresponding to the at least one network element from a database based on the user request, wherein the IP address template comprises a plurality of network parameters corresponding to positionally encoded bits of an IP schema;
   generate the multiple IP addresses of the at least one network element based on the set of user defined labels, the count of the multiple of IP addresses of the at least one network element, the IP address template and the IP schema; and
   display the generated multiple IP addresses of the at least one network element.

2. The system as claimed in claim 1, wherein the generate the multiple IP addresses of the at least one network element comprises:
   determine a set of system generated labels that describe the one or more network parameters of the plurality of network parameters defined in the IP address template based on the user request; and
   generate the multiple IP addresses of the at least one network element based on the set of user defined labels, the count of the multiple of IP addresses of the at least one network element, the IP address template, the IP schema, and the system generated labels.

3. The system as claimed in claim 1, wherein receive the user request to generate the multiple IP addresses of the at least one network element comprises:
   display a user interface to create the user request, wherein the user interface displays a plurality of input fields that describe one or more network parameters of the plurality of network parameters in the IP address template network parameters and an IP configuration count indication;
   receive the user defined label inputted in each input field of the plurality of input fields by the user;
   receive an input on the IP count configuration indication;
   display an IP configuration count interface comprising a configuration count field to configure the count of the multiple IP addresses to generated for the at least one IP configuration of the at least one network element;
   receive the count of the multiple IP addresses inputted in the configuration count field by the user; and
   generate the user request based on the inputted user defined labels in each of the input fields and the inputted count of the multiple IP addresses to be generated for the at least one IP configuration of the at least one network element.

4. The system as claimed in claim 1, wherein the network element is at least one of an network interface, a category of a device in the wireless network, a type of device in the wireless network, a vendor of a device in the wireless network, a service category of a device in the wireless network, and a network interface in the wireless network.

5. The system as claimed in claim 1, wherein the processor is configured to allocate the multiple IP addresses to the at least one network element.

6. A method for generating multiple Internet Protocol (IP) addresses in a wireless network, wherein the method comprises:

receiving, by a system, a user request to generate multiple IP addresses of at least one network element, wherein the user request comprises:
  a set of user defined labels corresponding to at least one IP configuration of the at least one network element defined in an IP template, and
  a count of the multiple IP addresses to generated for the at least one IP configuration of the at least one network element defined in the IP template;
retrieving, by the system, the IP address template corresponding to the at least one network element from a database based on the user request, wherein the IP address template comprises a plurality of network parameters corresponding to positionally encoded bits of an IP schema;
generating, by the system, the multiple IP addresses of the at least one network element based on the set of user defined labels, the count of the multiple of IP addresses of the at least one network element, the IP address template and the IP schema; and
displaying, by the system, the generated multiple IP addresses of the at least one network element.

7. The method as claimed in claim 6, wherein the generating, by the system, the multiple IP addresses of the at least one network element comprises:
  determining, by the system, a set of system generated labels that describe the one or more network parameters of the plurality of network parameters defined in the IP address template based on the user request; and
  generating, by the system, the multiple IP addresses of the at least one network element based on the set of user defined labels, the count of the multiple of IP addresses of the at least one network element, the IP address template, the IP schema, and the system generated labels.

8. The method as claimed in claim 6, wherein receiving, by the system, the user request to generate the multiple IP addresses of the at least one network element comprises:
  displaying, by the system, a user interface to create the user request, wherein the user interface displays a plurality of input fields that describe one or more network parameters of the plurality of network parameters in the IP address template network parameters and an IP configuration count indication;
  receiving, by the system, the user defined label inputted in each input field of the plurality of input fields by the user;
  receiving, by the system, an input on the IP count configuration indication;
  displaying, by the system, an IP configuration count interface comprising a configuration count field to configure the count of the multiple IP addresses to generated for the at least one IP configuration of the at least one network element;
  receiving, by the system, the count of the multiple IP addresses inputted in the configuration count field by the user; and
  generating, by the system, the user request based on the inputted user defined labels in each of the input fields and the inputted count of the multiple IP addresses to be generated for the at least one IP configuration of the at least one network element.

9. The method as claimed in claim 6, wherein the network element is at least one of an network interface, a category of a device in the wireless network, a type of device in the wireless network, a vendor of a device in the wireless network, a service category of a device in the wireless network, and a network interface in the wireless network.

10. The method as claimed in claim 6, wherein the method comprises allocating, by the system, the multiple IP addresses to the at least one network element.

* * * * *